(12) United States Patent
Kipnis

(10) Patent No.: US 11,698,022 B1
(45) Date of Patent: Jul. 11, 2023

(54) MODIFIED CYCLE TWO-STROKE ENGINE

(71) Applicant: Cyclazoom, LLC, Skokie, IL (US)

(72) Inventor: Michael Kipnis, Skokie, IL (US)

(73) Assignee: Cyclazoom, LLC, Skokie, IL (US)

( * ) Notice: Subject to any disclaimer, the term of this patent is extended or adjusted under 35 U.S.C. 154(b) by 0 days.

(21) Appl. No.: 17/805,905

(22) Filed: Jun. 8, 2022

Related U.S. Application Data

(60) Provisional application No. 63/364,925, filed on May 18, 2022.

(51) Int. Cl.
| | | |
|---|---|---|
| *F02B 29/06* | (2006.01) | |
| *F02B 75/02* | (2006.01) | |
| *F02B 33/30* | (2006.01) | |
| *F02M 35/104* | (2006.01) | |
| *F02B 33/04* | (2006.01) | |
| *F02B 33/44* | (2006.01) | |
| *F02B 21/00* | (2006.01) | |

(52) U.S. Cl.
CPC .............. *F02B 29/06* (2013.01); *F02B 21/00* (2013.01); *F02B 33/04* (2013.01); *F02B 33/30* (2013.01); *F02B 33/44* (2013.01); *F02B 75/02* (2013.01); *F02M 35/104* (2013.01); *F02B 2075/025* (2013.01)

(58) Field of Classification Search
CPC ........................... F02B 2075/025; F02B 29/02
See application file for complete search history.

(56) References Cited

U.S. PATENT DOCUMENTS

| | | |
|---|---|---|
| 2,431,563 A | 11/1947 | Johansson |
| 4,285,311 A | 8/1981 | Iio |
| 4,995,354 A | 2/1991 | Morikawa |
| 5,456,219 A | 10/1995 | Clarke |
| 6,393,841 B1 | 5/2002 | Van Husen |
| 7,845,317 B2 | 12/2010 | Max et al. |
| 7,975,485 B2 | 7/2011 | Zhao et al. |
| 8,677,749 B2 | 3/2014 | Laimboeck et al. |
| 8,910,613 B2 | 12/2014 | Amplatz |
| 9,121,330 B2 | 9/2015 | Straub |
| 11,236,651 B2 | 2/2022 | Foxhall et al. |

(Continued)

FOREIGN PATENT DOCUMENTS

| | | | | |
|---|---|---|---|---|
| FR | 2844001 A1 | * | 3/2004 | .............. F01N 1/02 |
| IE | S20060353 A2 | * | 10/2007 | |

(Continued)

*Primary Examiner* — Ngoc T Nguyen
(74) *Attorney, Agent, or Firm* — Brian Roffe

(57) ABSTRACT

Two-stroke engine includes a cylinder having a peripheral wall defining an interior space, a crankshaft coupled to a piston movable in the cylinder and having a power stroke in which air/fuel in the interior space is ignited and the crankshaft is rotated and a compression stroke, two intake conduits leading to the cylinder, and intake valves in the intake conduits that regulate air flow into the interior space. An exhaust conduit leads from an opening in the peripheral wall between lowermost and uppermost positions of the piston. An exhaust valve is in the exhaust conduit. In an exhaust-intake stroke after the power stroke when the piston has moved such that its upper surface is below the opening, the outlet valve opens, and air is inlet into the interior space through the intake valve(s) and forces combustion products to exhaust the interior space into the exhaust conduit.

20 Claims, 5 Drawing Sheets

(56) References Cited

U.S. PATENT DOCUMENTS

| | | | |
|---|---|---|---|
| 11,519,324 B1 * | 12/2022 | Kipnis | F02B 29/02 |
| 2005/0120985 A1 * | 6/2005 | Rosskamp | F02M 35/108 |
| | | | 123/73 PP |
| 2007/0272188 A1 * | 11/2007 | Geyer | F02M 35/10262 |
| | | | 123/179.16 |
| 2011/0114055 A1 * | 5/2011 | Naegele | F02M 1/02 |
| | | | 123/198 DB |
| 2012/0152216 A1 * | 6/2012 | Grether | F02B 25/14 |
| | | | 123/65 P |
| 2015/0114372 A1 * | 4/2015 | Cobb | F02B 75/02 |
| | | | 123/65 EM |
| 2021/0254544 A1 * | 8/2021 | Koehli | F02F 3/24 |

FOREIGN PATENT DOCUMENTS

| | | | | |
|---|---|---|---|---|
| JP | 2009185633 A * | 8/2009 | | F02B 25/22 |
| WO | WO-2010035684 A1 * | 4/2010 | | F02B 25/06 |

* cited by examiner

MODIFIED CYCLE TWO-STROKE ENGINE

CROSS-REFERENCE TO RELATED APPLICATION

This application claims priority of U.S. provisional patent application Ser. No. 63/364,925 filed May 18, 2022, now expired, which is incorporated by reference herein.

FIELD OF THE INVENTION

The present invention relates to a two-stroke engine with a modified cycle. The present invention also relates to a method for modifying a two-stroke engine to include an improved cycle. The present invention also relates to a cylinder for a two-stroke engine that enables an improved cycle.

The present invention also relates to compressor arrangements for internal combustion engines, and apparatus for providing a source of compressed air for such engines. The present invention also relates to two-stroke engines that include such compressor arrangements and methods for providing compressed air to such engines and methods for improving engine performance. The present invention also relates to methods for configuring a two-stroke engine to have multiple sources of compressed air, which are active based on operating conditions of the engine or a reservoir of compressed air.

BACKGROUND OF THE INVENTION

In two-stroke engines, the reciprocal movement of a piston inside a cylinder opens and closes an exhaust conduit through which exhaust gases are expelled from the cylinder. However, when fuel is introduced into the cylinder's combustion chamber, the piston often does not fully cover the exhaust conduit such that a portion of the fuel could flow out of the cylinder through the exhaust conduit, resulting in a significant loss of fuel and, moreover, in harmful emissions.

To address this problem, a tuned exhaust pipe is typically connected to the exhaust conduit in order to generate back pressure which prevents non-combusted fuel from being expelled through the exhaust conduit. However, such tuned exhaust pipes are functional at a particular load range of the engine (i.e., a speed range of the engine) and non-combusted fuel may still be lost when the engine operates outside of that load range.

U.S. Pat. No. 11,236,651 (Foxhall et al.) purports to address this issue by providing the engine, which has a crankcase, a crankshaft arranged partly in the crankcase, and a cylinder block connected to the crankcase and defining a cylinder therein. The cylinder defines at least one exhaust conduit for discharging exhaust fluid. A piston moves within the cylinder and is operatively connected to the crankshaft. The piston is movable along a cylinder axis in a reciprocating motion including an upstroke and a downstroke. An exhaust valve assembly is operatively connected to and rotatable with the crankshaft. The exhaust valve assembly has a shaft rotatably supported by the cylinder block and extending along a central axis, and a valve connected to the shaft and configured to cyclically obstruct the exhaust conduit. The valve is operable to move clear of the exhaust conduit before the piston uncovers the exhaust conduit during the downstroke of the piston, and at least partially close the exhaust conduit before the piston fully covers the exhaust conduit during the upstroke of the piston.

U.S. Pat. No. 6,393,841 (Van Husen) describes an internal combustion engine having separately designated combustion and exhaust powered cylinders, for implementing a dual exhaust expansion system which derives additional power from the combustion exhaust gases of each cylinder. The piston in each combustion exhaust cylinder is timed such that one leads the other by approximately 0-180 degrees crankshaft angle. Ignition of a first combustible air/fuel mixture produces combustion gases. Expansion of the combustion gases drives the first combustion piston during a first power stroke. Combustion gases are expelled from the cylinder to a second cylinder via fluidic passage to produce a second power stroke in the second cylinder, from there the combustion gasses are exhausted to atmosphere. Ignition of a second combustible air/fuel mixture produces combustion gases. Expansion of the combustion gases drives the second combustion piston during a third power stroke. Combustion gases are expelled from the second cylinder to the first cylinder via fluidic passage to produce a fourth power stroke in the first cylinder from there, the combustion gases are exhausted to atmosphere in a predetermined cycle. The engine also includes a blower that forces air through an intake port into the combustion exhaust cylinder during an initial portion of a first intake compression stroke of the combustion exhaust piston so that the air is subsequently compressed within the combustion exhaust cylinder during the remainder of the first intake compression stroke.

U.S. Pat. No. 7,975,485 (Zhao et al.) describes a reciprocal combustion engine integrated with both compound cycle and combined cycle. The engine includes a twin compound cylinder structure, with the first cylinder being the primary combustion and/or expansion cylinder; the second cylinder being the secondary combustion and/or expansion cylinder. Power strokes driven by expansions of different working fluids such as air-fuel mixture, steam, and compressed air, are integrated into one engine block. Twin cylinder structure provides compound expansions of three different fluids as to recover the energies that would be lost with the exhaust fluids or during braking. There is an outlet from the combustion chamber of the second cylinder to a piston valve that controls working fluid discharge from the second cylinder to an associated exhaust port, which is actuated vertically by exhaust gas pressure from the second cylinder.

U.S. Pat. No. 8,677,749 (Laimboeck et al.) describes an engine with a first set of exhaust ports in the cylinder walls that are coupled to a first exhaust turbine, which may be a pulse turbine. A second set of exhaust ports are provided in the cylinder walls that are opened by the piston near the end of the expansion stroke. The second set of exhaust ports is coupled to a second exhaust turbine, a low pressure turbine. The first and second sets of exhaust ports are decoupled, except when the piston uncovers the second plurality of exhaust ports such that they are coupled via the combustion chamber. By decoupling the ports, the high pressure turbine is provided gases at high pressure, while available. During the remainder of the exhaust process, the gases are flow to the lower pressure turbine. Additionally, the outlet of the high pressure turbine is coupled to the inlet of the low pressure turbine.

Additional prior art of interest includes U.S. Pat. No. 2,431,563 (Johansson), U.S. Pat. No. 4,285,311 (Iio), U.S. Pat. No. 4,995,354 (Morikawa), U.S. Pat. No. 5,456,219 (Clarke), U.S. Pat. No. 7,845,317 (Max et al.), U.S. Pat. No. 8,910,613 (Amplatz), and U.S. Pat. No. 9,121,330 (Straub).

OBJECTS AND SUMMARY OF THE INVENTION

It is an object of at least one embodiment of the present invention to provide new and improved two-stroke engines.

It is an object of at least one embodiment of the present invention to provide an improved exhaust flow for a two-stroke engine that is more efficient than prior art exhaust flows for two-stroke engines.

It is still another object of at least one embodiment of the present invention to provide an improved intake cycle for a two-stroke engine, which is more efficient than prior art intake cycles for two-stroke engines.

It is an object of at least one embodiment of the present invention to provide a method for retrofitting or modifying an existing two-stroke engine to have an improved exhaust flow and intake stroke.

In order to achieve one or more of these objects, and possibly others, an engine in accordance with the invention includes a cylinder having a peripheral wall defining an interior space at least part of which serves as a combustion chamber, a crankshaft, and a piston movable in the cylinder in a first direction in a power stroke in which a mixture of air and fuel in the interior space is ignited and the crankshaft to which the piston is coupled is rotated as a result of combustion of the air and fuel and movable in a second, opposite direction in a compression stroke. The engine also includes at least one intake conduit leading to the cylinder, for example two or four, and a respective intake valve associated with each intake conduit, and which regulates flow of the air from the respective intake conduit into the interior space.

In accordance with the invention, the engine also includes an exhaust or outlet conduit having an opening in the peripheral wall of the cylinder at a location between lowermost and uppermost positions of the piston, and an exhaust valve associated with the exhaust conduit. By associating, it means that the exhaust valve is able to control and/or regulate flow of gas from one side of the exhaust valve, i.e., that side leading to the interior space, to an opposite side of the exhaust valve into the exhaust conduit.

With this structure, the engine has an exhaust-intake stroke after the power stroke when the piston has moved such that an upper surface of the piston is below the opening, the exhaust valve is in an open state and air is inlet into the interior space through each intake valve and forces combustion products to exhaust into the exhaust conduit providing scavenging and clean air into the interior space. When the piston is close to the top dead center position, fuel (gas or diesel) is injected into the combustion chamber and then a spark plug ignites the air and fuel in the interior space to cause the power stroke.

The exhaust valve may be a reed valve or other similar valve that is in the exhaust conduit. The exhaust valve may be configured to open based on a pressure differential whereby a greater pressure in the interior space than in the exhaust conduit causes movement of the exhaust valve to the open state. Equal or lower pressure does not cause the exhaust valve to open or remain open.

Preferably, to reduce turbulence as the exhaust gas flows into the exhaust conduit, a region between the opening and the peripheral wall of the cylinder is smooth without any sharp edges.

A method for modifying an engine in accordance with the invention is operative on an engine that includes a cylinder having a peripheral wall defining an interior space, a crankshaft, a piston movable in the interior space of the cylinder in a first direction in a power stroke in which a mixture of air and fuel in the interior space is ignited and the crankshaft to which the piston is coupled is rotated as a result of combustion of the mixture of air and fuel and movable in a second, opposite direction in a compression stroke, two or more intake conduits or ports leading to the cylinder, and a respective intake valve associated with each intake conduit and which regulates flow of air from the intake conduit into the interior space, fuel being injected using fuel injector. The method involves altering the form of the cylinder to provide it with an exhaust conduit having an opening in the peripheral wall of the cylinder at a location between lowermost and uppermost positions of the piston, and intake conduits and valves supplying compressed air from a separate compressor into the cylinder and providing scavenging at the same time.

Then, the engine is operated to include an exhaust-intake stroke by coupling an exhaust valve to the exhaust conduit. The exhaust valve is configured to open to cause combustion products to exhaust through the exhaust valve into the exhaust conduit when the piston has moved such that an upper surface of the piston is below the opening, and air is inlet into the interior space through and/or around each intake valve supplying compressed air, by means of a pressure differential, and forces combustion products to exhaust the interior space through the exhaust valve into the exhaust conduit (referred to as scavenging).

The same features of the engine described above can be used or added with modifying the prior art engine. For example, coupling the exhaust valve to the exhaust conduit may entail placing the exhaust valve in the exhaust conduit or placing a reed valve in the conduit. Such an exhaust valve is configured to open based on a pressure differential whereby a greater pressure in the interior space than in the exhaust conduit causes movement of the valve to the open state.

More generally, the invention also encompasses a cylinder for an engine including a peripheral wall defining an interior space, a piston that moves in the interior space in a first direction in a power and exhaust stroke and air intake stage, and a second, opposite direction in a compression stroke, two intake conduits or ports leading to the interior space, and a respective intake valve associated with each intake conduit and regulating flow of air from the intake conduit into the interior space. Fuel is injected using a fuel injector. The interior space includes an interior space at least part of which serves as a combustion chamber dependent on the position of the piston relative to a wall defining the cylinder toward and away from which the piston moves.

The cylinder also includes an exhaust conduit having an opening in the peripheral wall at a location between lowermost and uppermost positions of the piston, and an exhaust valve associated with the exhaust conduit. As in the engine described above, in an exhaust-intake stroke after the power stroke when the piston has moved such that an upper surface of the piston is below the opening, the exhaust valve is in an open state and compressed air is inlet into the interior space through the at least one intake valve and forces combustion products to exhaust the interior space through the exhaust valve into the exhaust conduit. The same features of the engine described above can be used or added with modifying the prior art engine.

An apparatus for providing a source of compressed air for a two-stroke engine having an engine cylinder and an engine crankshaft, includes a rotatable compressor crankshaft, a compressor cylinder defining an interior space and including a surface defining the interior space having a first aperture and a second aperture, a first valve in the first aperture, a second valve in the second aperture, a piston compressor moved upon rotation of the compressor crankshaft in the interior space of the compressor cylinder, a compressor intake conduit leading from ambient environment to the first aperture, and an air tank. The apparatus also includes a compressor outlet conduit leading from the second aperture to the air tank, an engine intake conduit leading from the air tank to an interior space of the engine cylinder of the engine, and interconnection structure that interconnects the compressor crankshaft to the engine crankshaft such that rotation of the engine crankshaft causes rotation of the compressor crankshaft.

In use, rotation of the compressor crankshaft causes movement of the piston compressor in the interior space of the compressor cylinder and compression of air inlet into the interior space through the compressor intake conduit and the first valve and outflow of compressed air through the compressor outlet conduit and the second valve to the air tank.

In one embodiment, the interconnection structure includes an automatic clutch connected to the engine crankshaft and a gear connected to the automatic clutch and the compressor crankshaft. The piston compressor may include a rod connected eccentrically to the compressor crankshaft. The piston compressor may further include a piston connected to the rod and movable in the interior space while surrounded by the compressor cylinder.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
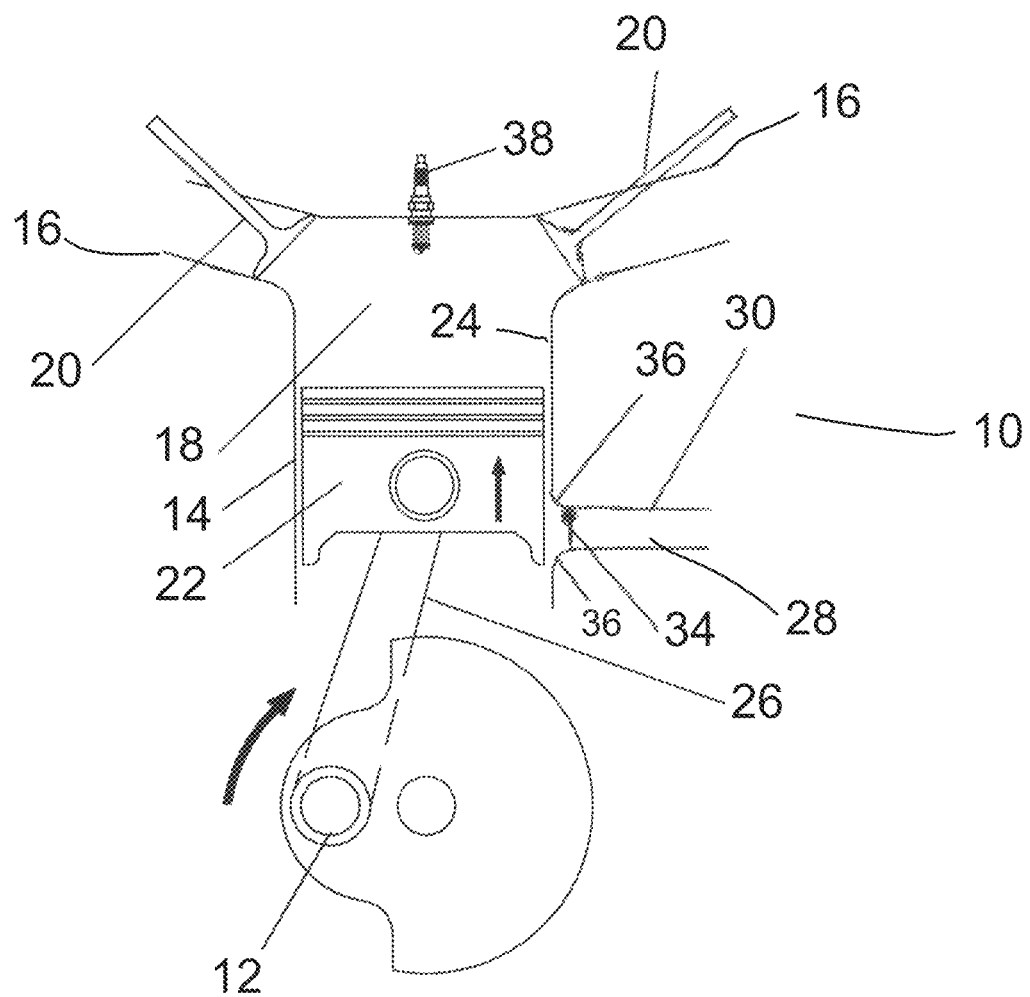
FIG. 1 is a schematic of the compression stroke of a two-stroke engine in accordance with the invention.
Figure 2:
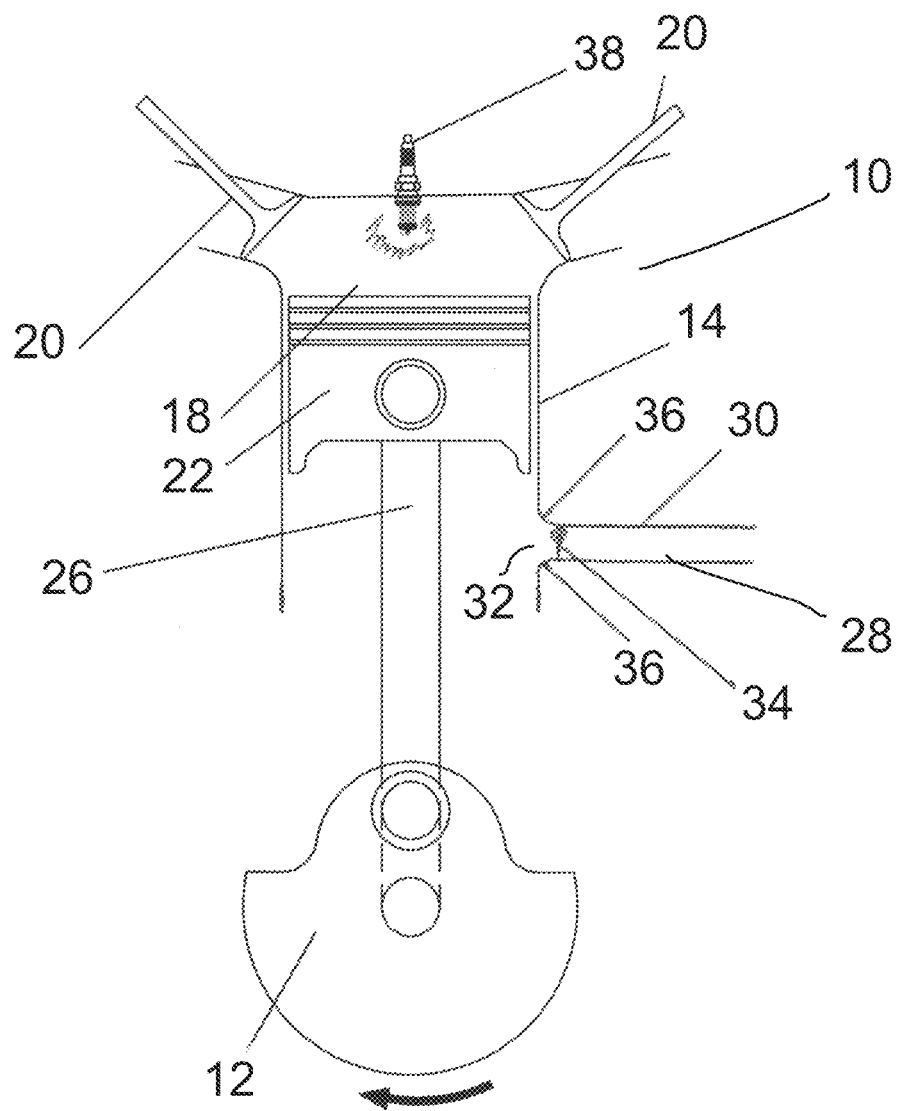
FIG. 2 is a schematic of the power stroke of the engine of FIG. 1.
Figure 3:
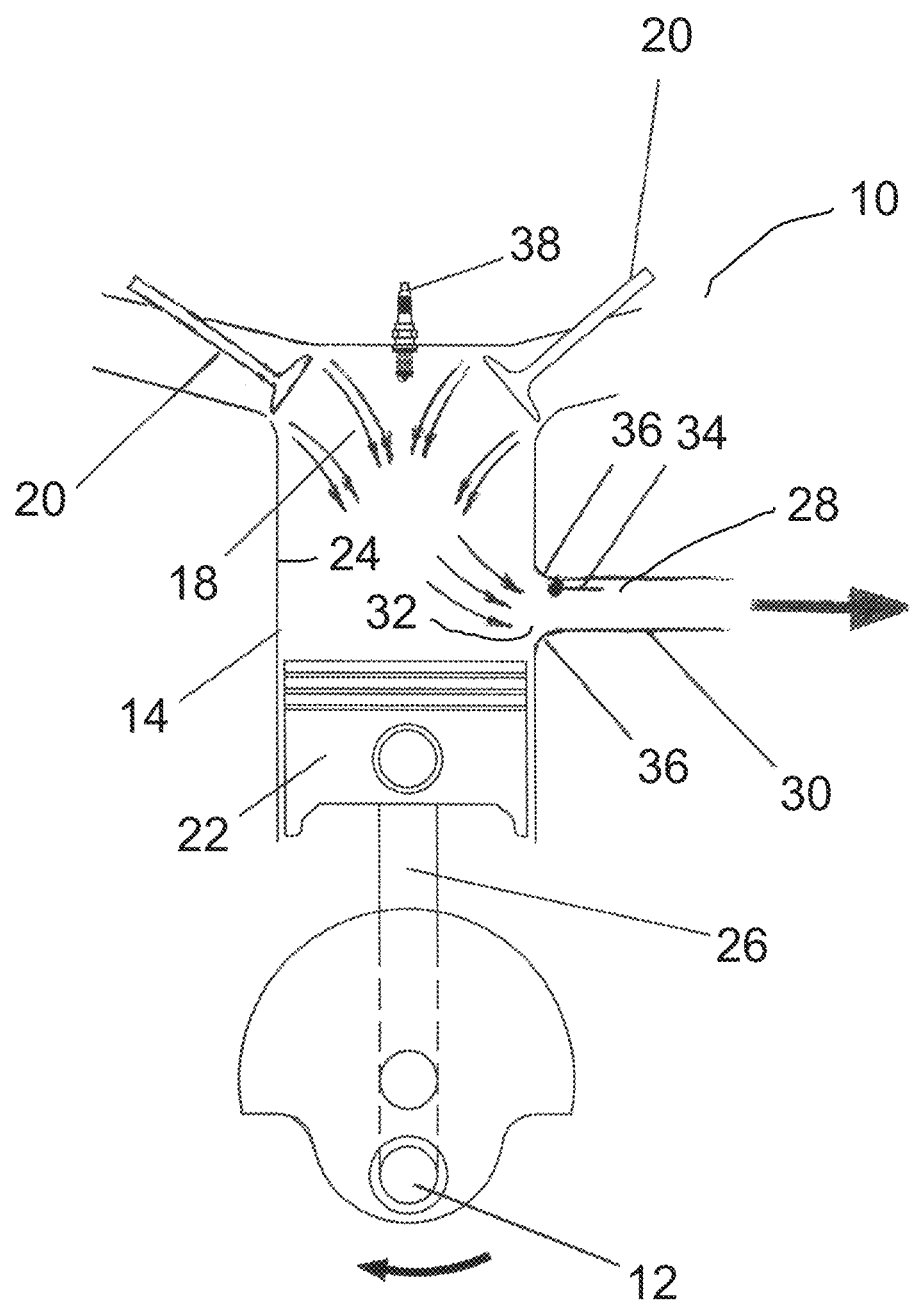
FIG. 3 is a schematic of the exhaust-intake stroke of the engine of FIG. 1.
Figure 4:
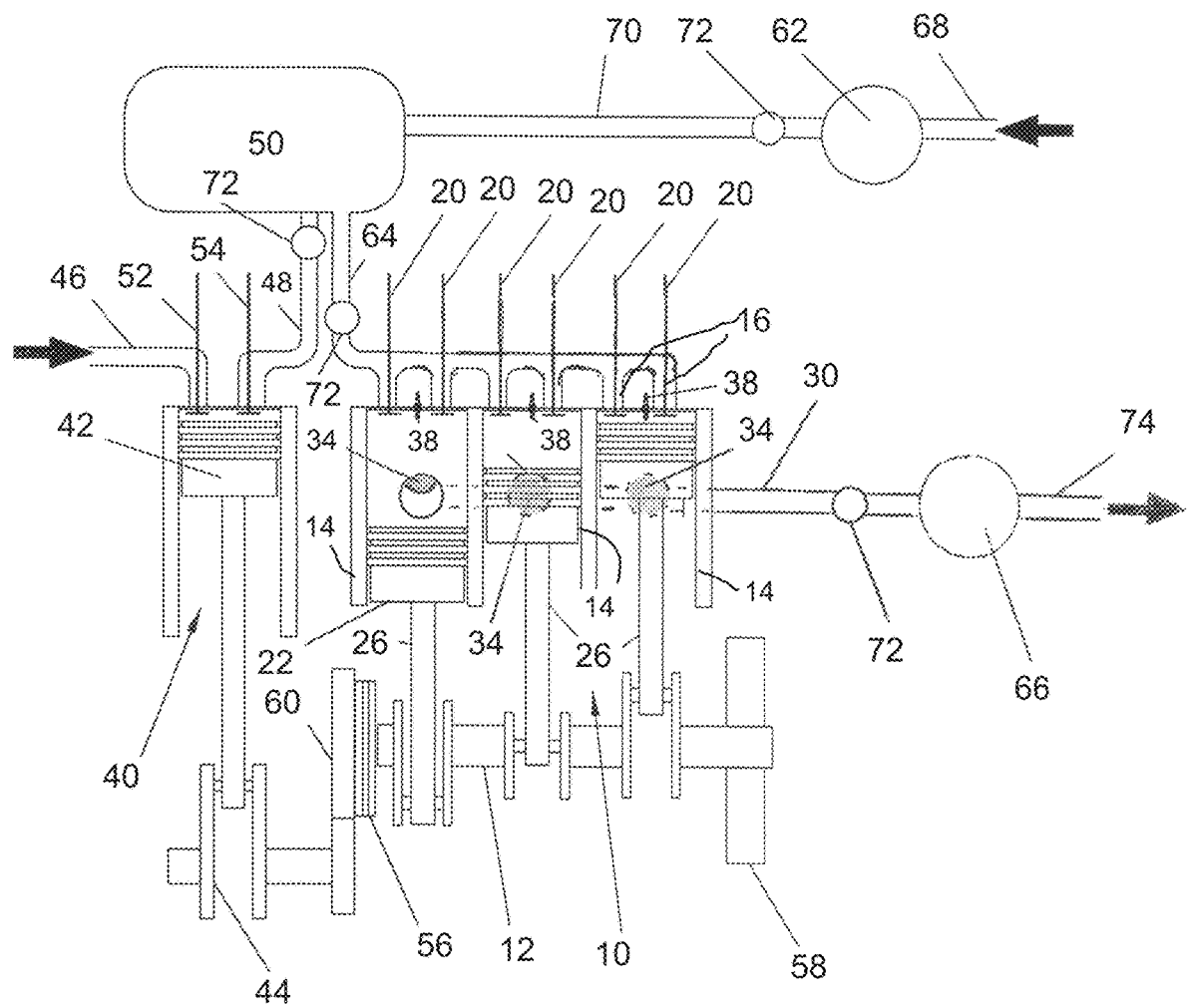
FIG. 4 is a schematic of a compressor (combination of compressors) in accordance with the invention shown applied to an internal combustion two-stroke engine including cylinders as shown in FIGS. 1-3.
Figure 5:
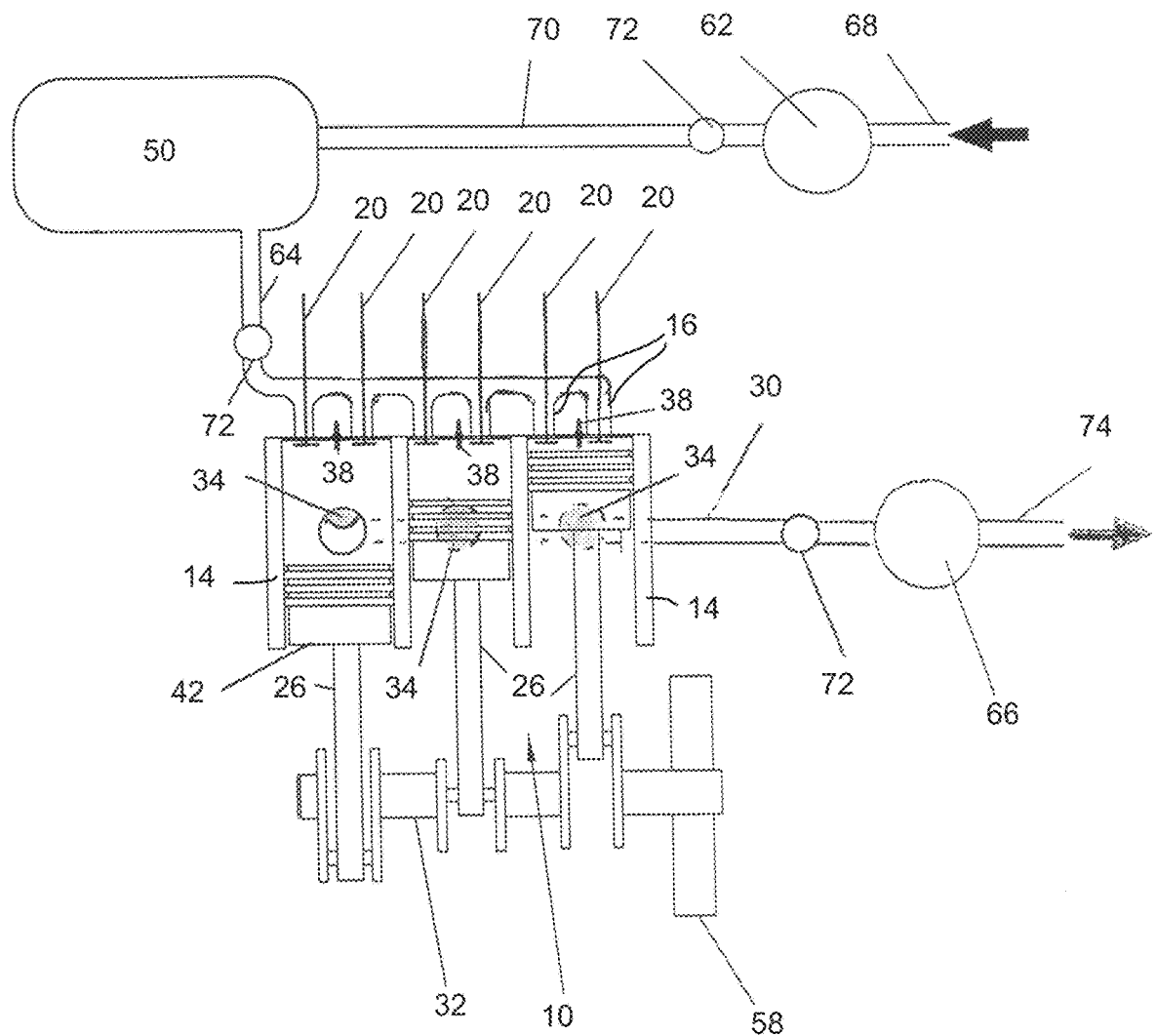
FIG. 5 is a schematic of an engine including a turbocharger or other power source for compressed air (mechanical or electrical, for example) in accordance with the invention, applied to an internal combustion two-stroke engine including cylinders as shown in FIGS. 1-3 and excluding a piston compressor arrangement.

Referring to the accompanying drawings wherein the same reference numbers refer to the same or similar components, FIGS. 1-3 depict a cylinder assembly of a two-stroke engine in accordance with the invention. The engine 10 includes components typical of two-stroke engines, most of which are not shown in great detail, such as a crankcase and a cylinder block connected to the crankcase. As shown, the engine 10 includes a crankshaft 12 which is arranged partly in the crankcase, and a cylinder 14 is defined by the crankcase (or multiple cylinders as shown in FIGS. 4 and 5). Engine 10 has a form and includes components to enable it to function in the traditional manner of an engine. Some of the components are shown and identified while others may be present but do not interact with the novel parts of the engine in accordance with the invention.

The engine 10 defines two intake conduits 16 having an opening through which air is input to a combustion chamber 18 defined in the engine 10. Intake conduits 16 may be at least partly formed in the crankcase. The combustion chamber 18 in at least part of the interior space defined by the engine 10. There is an intake valve 20 for each intake conduit 16, typically in the opening of the conduit 16.

The intake valves 20, which are each shown in a closed position in FIG. 1, may be any conventional valves for engines but preferably are of the type disclosed in U.S. Pat. No. 10,787,939, the entire disclosure of which is incorporated by reference herein. As to the number of intake conduits 16 and intake valves 20 therein, there may be a different number than two such intake conduits 16 and intake valves 20 as shown, e.g., only one, or three, or more.

A piston 22 moves within the interior space of the cylinder 14 of the engine 10, i.e., within a space defined in part by a peripheral wall 24 of the cylinder 14 of the engine 10 and an axial wall, and is operatively connected to the crankshaft 12 by a connection rod 26. The piston 22 is movable along a cylinder axis in a reciprocating motion including an upstroke and a downstroke. Axial movement of the piston 22 changes the size or volume of the combustion chamber 18.

Exhaust assembly 28 includes an exhaust or outlet conduit 30 extending from an opening 32 in the peripheral wall 24 on the side of the cylinder 14 (not shown in FIGS. 4 and 5). This opening 32 is positioned to be above the upper surface of the piston 22 when the piston 22 is in the down position (see FIG. 3). The piston 22 has a solid wall along a portion that passes alongside the opening 32. Exhaust conduit 30 may be formed at least partly in the crankcase.

An exhaust valve or outlet port valve 34, such as a reed valve or other suitable or comparable valve, is generally associated with and specifically positioned in the exhaust conduit 30. A reed valve is a type of check valve which restricts the flow of fluids to a single direction, opening and closing under changing pressure on each face. Modern versions often consist of flexible metal or composite materials (fiberglass or carbon fiber). Thus, the reed valve 34 enables flow from the combustion chamber 18 into the exhaust conduit 30, and prevents flow the exhaust conduit 30 into the combustion chamber 18.

The region 36 between the inlet of the exhaust conduit 30 and the side, interior surface of the peripheral wall 24 of the cylinder 14 is preferably made to be smooth without any sharp edges to thereby reduce turbulence (which concept of constructing or configuring engine parts without sharp edges is disclosed in U.S. Pat. No. 10,787,939, the entire disclosure of which is incorporated by reference herein).

A spark plug 38 is provided for the cylinder 14, and represents any mechanism to generate a spark to cause ignition of gas in the combustion chamber 18. The spark plug 38 is located on a top wall of the cylinder 14.

FIG. 1 shows the compression stroke of the engine 10 wherein the intake valves 20 are both in a closed position and the piston 22 is moving upward in one direction toward one side of the cylinder 14, the top in the illustrated orientation. Reed valve 34 is in a closed state (a view toward the valve 34 in its closed state is similar to that seen in the middle and right cylinders in FIGS. 4 and 5). In this stroke, as the crankshaft 12 rotates clockwise from the bottom dead center position in the direction of the arrow, gas in the combustion chamber 18 is being compressed in the cylinder 14.

FIG. 2 shows the power stroke as the crankshaft 12 continues its clockwise rotation to the top dead center position. During this stroke, the spark plug 38 is controlled to ignite the gas in the combustion chamber 18, which contains air and fuel, and the combustion causes the piston 22 to be forced away from the top of the cylinder 14 toward the opposite side of the cylinder, i.e., the bottom in the illustrated orientation. The intake valves 20 remain in the closed position. The piston 22 begins its movement in the opposite direction than the direction it was moving in during the compression stroke shown in FIG. 1.

FIG. 3 shows the exhaust and intake stroke, which follows the power stroke and with the piston 22 still moving in the opposite direction than the direction it was moving in during the compression stroke shown in FIG. 1. As shown, the piston 22 has moved downward as a result of the combustion of the gas in the combustion chamber 18. The piston 22, as it moves to the bottom dead center position, passes the opening 32 in the peripheral wall 24 of the cylinder 14. The reed valve 34 opens to allows for flow of the exhaust gas, i.e., the combustion products, out of the combustion chamber 18 to the exhaust conduit 30 (a view toward the valve 34 is similar to that seen in the left cylinder in FIGS. 4 and 5).

At the same time, the intake valves 20 open to allow for inflow of compressed air into the combustion chamber 18 for the next ignition. Thus, there is a flow created in the combustion chamber 18 from the area of the intake valves 20 to the opening 32 in the peripheral wall 24 of the cylinder 14 and through this opening 32 under or around the reed valve 34 into the exhaust conduit 30 (which flow is represented by the arrows in FIG. 3). This process may be referred to as intake scavenging.

The parameters of the cylinder 14, the piston 22, the opening 32, and other parts of the engine 10 or the cylinder 14 may be configured to provide for appropriate timing to optimize this flow. It happens that the air flowing into the combustion chamber 18 through and/or around the intake valves 20 pushes the exhaust gas into the exhaust conduit 30. There is a pressure differential on opposite sides of the intake valves 20 so that when the intake valves 20 open, there is a rush of the air into the combustion chamber 18 and this fast flow forces the exhaust gas through the opening 32 in the peripheral wall 24 of the cylinder 14 and into the exhaust conduit 30. Fuel flows into the combustion chamber 18 from a fuel injector (not shown).

When closed, the reed valve 34 does not allow for flow of gas from the exhaust conduit 30 into the combustion chamber 18 or to the area around or below the piston 22.

The timing of the opening and closing of the intake valves 20 may be controlled by a control unit (not shown) based on the movement of the piston 22 or there may be a structural component or assembly that opens the intake valves based on the movement of the piston 22. Either way, the intake valves 20 open only when inflow of air into the combustion chamber 18 is desired relative to the position of the piston 22 to cause the intake stroke and scavenging and the directional flow of gas from the area of the intake valves 20 to the opening 32 leading to the exhaust conduit 30.

There are advantages of the exhaust assembly 28, which may be adapted to any existing two-stroke engine. For example, for the compression and power strokes depicted in FIGS. 1 and 2, respectively, the combustion speed is relatively high, and the mixture of air and fuel in the combustion chamber 18 for each combustion event is cleaner since the combustion products of the previous combustion have been more completely removed and exhaust, and there is thus an improved combustion with little or no misfires. In this regard, based on the construction of the cylinder 14, since the combustion products from the previous combustion stroke have been removed to a greater extent than in prior art engines, there is the ability to input more air into the cylinder in the intake stroke. The volume of the combustion chamber 18 is finite so by removing more combustion products, there is an attendant ability to fill this volume with more air and fuel for the next combustion, and thereby improve the energy production. It also results in a reduction in the remaining pressure in the combustion chamber thereby reducing back pressure on the piston.

The fuel efficiency increases, more fuel power is obtained for each unit of fuel, there is more power from the displacement volume, all of which provide a faster, more fuller, and high efficiency fuel ignition.

In the exhaust and intake stroke depicted in FIG. 3, there is a faster and more complete removal of the exhaust gas, providing a better removal of the exhaust gas. There is minimal back pressure on the piston 22 on the exhaust stroke resulting in high engine efficiency. There are also lower pumping losses and lower emissions thereby reducing environmental damage and increased power from the displacement volume.

Overall, there is improved fuel economy, high engine efficiency and reduced emission and pollutants. As such, the engine 10 provides extremely beneficial advantages of vehicles.

The teachings of the invention can be applied to retrofit or modify an existing engine. The existing engine would typically include a cylinder having a peripheral wall defining a combustion chamber, a crankshaft, a piston movable in the cylinder toward a first side of the cylinder in an exhaust stroke and toward a second, opposite side of the cylinder in a power stroke in which a mixture of air and fuel in the combustion chamber is ignited and the crankshaft to which the piston is coupled is rotated as a result of combustion of the mixture of air and fuel, an intake valve associated with the cylinder regulating flow of air into the combustion chamber, and an exhaust valve associated with the cylinder regulating flow of products of combustion out of the combustion chamber. The crankshaft may be coupled to the piston via a connection rod as in FIGS. 1-3.

FIG. 4 is a schematic of the two-stroke engine 10 with additional relevant parts needed to provide an explanation of the manner in which a compressor is advantageously coupled to the engine, but which compressor is not necessary in the certain engine work phases (regions).

Engine 10 includes a compressor 40 including a piston compressor 42 having a rod connected to a compressor crankshaft 44, e.g., in a manner known to those skilled in the engine field such as eccentrically. A head portion of the piston of the piston compressor 42 is movable in a cylindrical compartment of a housing of the compressor 40 to compress gas (air) between the exposed surface of the head portion of the piston and the inner surface of the housing of the compressor 40 (the compressor housing) defining the compartment, i.e., in this case, the upper surface of the head portion of the piston and the lower surface of the compressor housing.

The lower surface of the compressor housing above the cylinder has two apertures separated from one another and which each lead into a respective conduit 46, 48. An interior space is defined by the housing of the compressor 40 and is open to the bottom so that the piston rod can extend into the interior space.

One conduit 46 is a compressor air intake conduit through which air flows to be inlet into the compressor 40 through an intake conduit in the direction of the associated arrow, which is one of the apertures in the lower surface of the compressor housing. The other conduit 48 is a compressor outlet or outtake conduit through which air flows when outlet from the compressor through an outlet port, which is the other one of the apertures in the lower surface of the compressor housing. Conduit 48 leads to a high pressure air tank 50.

Preferably, valves 52, 54 are situated in each of the intake and outlet conduits 46, 48 or the apertures thereof to regulate the flow of air from the ambient atmosphere or environment into the compressor and the flow out of the compressor to the air tank 50, respectively. These valves 52, 54 can have any known structure for a valve used with a piston cylinder to regulate air or gas inflow or outflow. The manner in which these valves 52, 54 are controlled to be cycle-dependent to enable air to be inlet for subsequent compression when in the interior space and the compressed air to be outlet is known to those skilled in the art to which this invention pertains. Valve 52 would be open during the inlet of air into the interior space and valve 54 would be closed at this time, and valve 52 would be closed and valve 54 would be open when the compressed air is being outlet to the air tank 50.

Engine 10 also includes a plurality of engine pistons 22 in respective cylinders 14, three of which are shown (see FIGS. 1-3 and the explanation thereof). The three illustrated pistons 22 do not limit the invention in any manner whatsoever and more or less than three engine pistons 22 may be provided in an engine in accordance with the invention. Also, although the engine pistons 22 are shown in a row, other configurations and relative arrangements of multiple engine pistons and the cylinders in which they move are also possible and considered to be within the scope of the invention. Each piston 22 includes the respective connection rod 26 connected to the common engine crankshaft 12. Conduit 30 leads from the opening 32 of each cylinder 14, although there may be a manifold or separate conduits 30 leading from the opening of the cylinders 14. The single conduit 30 shown in FIG. 4 represents the combined outlet of the cylinders 14.

To couple the engine crankshaft 12 to the compressor 40, an automatic clutch 56 is connected to one end of the engine crankshaft 12. A gear 60 is alongside and possibly physically connected to the clutch 56, and also connected via cooperating teeth to the compressor crankshaft 44. An opposite end of the engine crankshaft 12 is connected to an engine flywheel 58. The connections of the engine structure to other parts of an engine and a vehicle as known to those skilled in the art to which this invention pertains may be used in the invention.

Gear 60 has a conventional structure with teeth, the size, shape, number and arrangement of which can vary to optimize the invention, which optimization would be readily ascertainable to those skilled in the art to which this invention pertains. Gear 60 is arranged to provide the necessary capacity of the compressor 40. Gear 60 is provided to enable powering of the piston compressor 42 to feed the air tank 50 with compressed air, in combination with the compressor 62 to thereby enable operation of the engine 10 being provided with compressed air to the piston cylinders 14 thereof (with fuel from another source). When the pressure in the air tank 50, which may be monitored by a monitoring device associated with or attached to the air tank 50 (not shown), reaches a necessary magnitude, the compressor 40 can be disconnected from the engine 10 by the automatic clutch 56 and air supply will be only from the high efficiency compressor 62, discussed below (similar to the configuration shown in FIG. 5). The automatic clutch 56 can be re-connected to the compressor 40 whenever necessary.

Automatic clutch 56 may therefore be controlled by a control device or mechanism to provide two different operating states, one operating state or configuration wherein the rotation of the engine crankshaft 12 is transferred to the compressor crankshaft 44 (so that compressor 40 compresses air and supplies the compressed air to the air tank 50), and another operating state or configuration wherein the rotation of the engine crankshaft 12 is not and cannot be transferred to the compressor crankshaft 44 (wherein compressed air is supplied only by compressor 62). One skilled in the art would be able to define the control parameters to regulate the operation of the compressor 40 to toggle or switch between these two operating states or configurations.

The surface of the engine housing defining the piston cylinders 14 has two apertures for each compartment separated from one another and which each lead into a manifold 64 defining conduits 16. Manifold 64 defining conduits 16 comprises an engine intake conduit system through which air flows from the high pressure air tank 50 to be inlet into the piston cylinders 14 of the engine 10 through and/or around a respective intake valve 20 in the apertures in the surface of the engine housing defining the piston cylinders 14.

As for exhaust from the cylinders 14, a conduit leads from the opening 32 of each cylinder 14 to the single conduit 30 shown in FIG. 4. As mentioned above, there may be a manifold and separate conduits leading from the openings of the cylinders 14 to the manifold or other structure to combine the exhaust gas from the cylinders 14.

It can be appreciated from FIG. 4, as well as FIG. 5, that when multiple cylinder 14 are provided, the cylinders 14 will be in different positions relative to the respective opening during rotation of the engine crankshaft 12. The leftmost cylinder 14 has its piston 22 below the respective opening 32 so that for this cylinder, exhaust gas is flowing through to the conduit 30. On the other hand, the middle and rightmost cylinders 14 have their pistons 22 on the level of or above the respective opening 32 so that they do not exhaust to the conduit 30. Which cylinders 14 exhaust to the conduit 30 changes as the engine crankshaft 12 rotates.

Conduit 30 leads to a turbocharger 66 or turboelectrical generator or any other device to convert power of the exhaust gases and provides exhaust gas to the turbocharger 66. The turbocharger 66 has a construction known to those skilled in the art and converts energy from the exhaust gas into energy to operate the compressor 62. In one embodiment, the turbocharger 66 and compressor 62 are connected to a common shaft so that this shaft is rotated by the outflow of exhaust gas, i.e., the exhaust gas impacts against part of the turbocharger 66 and causes rotation of the shaft, which shaft rotation is then used to compress air being inlet through the compressor inlet 68 in the direction of the associated arrow. This shaft is not shown in the illustrated embodiments, partly in view of the schematic representation of these elements. Other connections between the turbocharger 66 and the compressor 62 may also be used in the invention. The exhaust gas flow out of the turbocharger 66 through a conduit 74 in the direction of the associated arrow.

In some embodiments, power for the air compressor 62 can be provided mechanically by means of a belt, shaft or chain connected to the engine's crankshaft additionally or alternatively to being provided by a turbocharger driven by exhaust gas, or any combination of any of these means to provide power to the air compressor 62.

Air compressor 62, itself, can be a type of turbocharger, supercharger, electrical or any combination of these, for example, a turbocharger and supercharger which provides a very high efficiency compressed air supply at any RPM. Air compressed by the compressor 62 is directed through a conduit 70 to the high pressure air tank 50 to be available for use by the engine 10, via conduits 16 defined by manifold 64.

An important aspect of the invention is that the amount of compressed air in the high pressure air tank 50 is increased because it is not only the result of action by the compressor 62 to compress air being inlet through the compressor conduit 70, but also receives air compressed by the action of the compressor 40. Accordingly, there are two compressors associated with the engine, namely, compressor 62 operated by the turbocharger 66 and compressor 40 operated by the interconnection with the engine crankshaft 12. Thus, dual compressive action enhances the production of compressed air, greatly increasing its availability and volume, without major modifications to the engine 10.

In the embodiment of the invention in FIG. 4, the compressor 40 is not a part of the engine 10 but is separated from the engine 10, yet moved by the engine 10 in view of the interconnection. Although this interconnection is shown by an automatic clutch 56, a gear 60 and a compressor crankshaft 44, other interconnection structure may be used without deviating from the scope and spirit of the invention. It is important though that the compressor 40 is moved within its cylinder to compress air based on already existing motive force. This already existing motive force is the rotational force of the engine crankshaft 12.

Valves 72, shown schematically, are preferably provided in or in association with the conduits 30, 48, 70 and the conduit of the manifold 64 and are regulated or configured in a preferred operating state to be open when the engine 10 is operating and to be closed when engine 10 is not operating to maintain the air pressure in the air tank 50, e.g., at or above a desired, possibly predetermined or preconfigured level. A control device or mechanism (not shown) is coupled to the valves 72 to perform oversight and control functionality. Valves 72 may also be integrated into the air tank 50. The manner in which the valves 72 are placed in the conduits 30, 48, 70 and the conduit of the manifold 64 and/or integrated into the air tank 50 may be any known technique to flow control. Generally, the valves 72 should be considered to present flow control means or a mechanism to control flow of the compressed air, enabling flow in certain operating conditions and preventing flow in other operating conditions. Other flow control schemes and mechanisms to ensure air pressure in the air tank 50 is maintained during non-operation of the engine 10 may also be used in the invention without deviating from the scope and spirit thereof. The valve 72 in the conduit 30 is optional and may be removed.

FIG. 5 shows an embodiment similar to the embodiment shown in FIG. 4 except that the piston compressor structure is omitted (and is also the operational configuration when the compressor 40 is not operating since the clutch 56 is disconnected from the piston compressor and from the engine crankshaft 12). Indeed, this is also a possible construction of the invention, i.e., without the automatic clutch 56 connected to the common crankshaft 12 of the engine 10, without the gear connected to the automatic clutch 56, and without the piston compressor 40. The conduits 46, 48 and valves 52, 54 are also omitted. Although the advantages of the presence of the compressor 40 are not obtained, this embodiment may still provide benefits relative to prior art engines with turbochargers, superchargers, electrical or any other known compressors.

The manner in which fuel is injected into the interior spaces of the engine cylinders is known to those skilled in the art to which this invention and is not depicted in the drawings. Any contemporary technology to achieve the fuel injection is possible in accordance with the invention. The interior space is defined by the housing of the engine 10 and is open to the bottom so that the rod can extend into the interior space.

By directing compressed air into the interior spaces of the engine cylinders, there is an increase in the filling of the interior spaces and therefore the power obtained from the displacement volume.

The internal combustion engine/piston (ICE) of prior art designs is a compressor itself and has compressor capabilities at the same time on an intake action cycle, to provide air for the burning fuel. However, they are invariably extremely low efficiency and therefore have high pumping parasitic losses. An object of the invention described above is to reduce these losses, improve and increase the intake cycle efficiency and power the engine awhile at the same time, reducing emissions and pollution. By providing compressor 62, with or without the compressor 40, an arrangement is designed to be highly efficient, relative to prior art constructions, and combined with electric, twin screw supercharger, other types of superchargers, turbochargers or any other type of structure.

As used herein, the ambient environment or the ambient atmosphere is any space or area outside of the engine or the compressor. It is not an internal cavity or space but rather is the space or area around the engine or the vehicle in which the engine is situated or even within the vehicle, but not within the engine or compressor.

The invention also relates to a method for compressing air using an engine having an engine crankshaft. In this method, the rotatable compressor crankshaft 44 is selectively coupled to the engine crankshaft 12, which means that at times it is connected while at other times, it is not connected. Compressed air is generated upon rotation of the compressor crankshaft 44 by causing the compressor crankshaft 44 to move the compressor piston 42 in an interior space of a compressor cylinder, regulating flow of air from ambient environment into the interior space defined in part by the piston compressor through the valve 52, and regulating flow of compressed air from the interior space into the air tank 50 through a second valve 54. The compressed air is supplied from the air tank 50 for use by the engine 10 (as described above).

The compressor crankshaft 44 may be selectively coupled to the engine crankshaft 12 based on pressure in the air tank, this being a preferred possibility but not the only possibility. As such, when the air pressure in the air tank 50 is below a threshold predefined, predetermined or preconfigured level, compressor 40 is connected to the engine 10 via clutch 56 and is operative to generate compressed air to increase the pressure in the air tank 50. When the air pressure in the air tank 50 is at or above the same or a different threshold predefined, predetermined or preconfigured level, compressor 40 may be disconnected from the engine 10 via clutch 56 and is no longer operative to generate compressed air. The compressor crankshaft 44 may be selectively coupled to the engine crankshaft 12 by a controllable clutch, such as but not limited to automatic clutch 56. The control device to operate clutch 56 may be a remotely situated control unit coupled, e.g., mechanically or electrically, to the clutch 56. Such connections known to those in the art to which this invention pertains may be used in the invention.

The flow of air from ambient environment into the interior space defined in part by the piston compressor through the first valve is regulated during a stroke of the piston compressor away from a surface of the compressor cylinder in which the first valve is situated. The flow of compressed air from the interior space into the air tank through the second valve is regulated during another stroke of the piston compressor toward from the surface of the compressor cylinder in which the second valve is situated.

In one embodiment, a turbocharger or similar apparatus is connected to an outlet conduit of the engine through which exhaust gas flows, a compressor is connected to the turbocharger or similar apparatus, and in operation, air is input from the ambient environment into the compressor wherein it is compressed upon exhaust of gas from the engine, and the compressed air is directed from the compressor to the air tank, e.g., through a conduit. In this case, the compressor crankshaft may be decoupled from the engine crankshaft once the compressor 62 is providing compressed air to the air tank to maintain the pressure in the air tank above a threshold level.

Although the engine 10 is shown in a schematic, the complete construction thereof would be readily ascertainable by those skilled in the art to which this invention pertains in view of the disclosure herein. For example, it is understood that the pistons described above have a conventional shape of a piston while the cylinders in which the piston move have a conventional shape of a cylinder. The connections of the rods of the pistons to the crankshafts and the structure of the crankshafts are also known in the art. The manner in which the crankshafts 12, 44 are mounted to enable their rotation are also known to those skilled in the art to which this invention pertains, and may involve use of bearings and the like. The conduits described above may be any type of pipe or tubular component defining a passage therein for flow of air or exhaust gas. The air tank disclosed below may have any shape. The engine block in which the combustion chambers are situated may be any shape. To the extent needed, the disclosures of the following U.S. patents are incorporated by reference herein, U.S. Pat. Nos. 5,491, 977, 6,449,965, 7,111,704, 7,621,253, 8,191,517, 8,322,138, 8,499,727, 8,714,119 and 9,033,834.

The invention also relates to a method for modifying an engine including a cylinder having a peripheral wall defining an interior space, a crankshaft, a piston movable in the interior space of the cylinder in a first direction in a power stroke in which air and fuel in the interior space is ignited and the crankshaft to which the piston is coupled is rotated as a result of combustion of the air and fuel and movable in a second, opposite direction in a compression stroke, two intake ports or conduits leading to the cylinder, and a respective intake valve associated with each intake conduit and regulating flow of the air from the intake conduit into the interior space. In the method, an exhaust conduit 30 is provided having an opening 32 in the peripheral wall 24 of the cylinder 14 at a location between lowermost and uppermost positions of the piston 22. An exhaust-intake stroke is formed by coupling an exhaust valve 34 to the exhaust conduit 30 and which is configured to open to cause combustion products to exhaust through the exhaust valve 34 into the exhaust conduit 30 when the piston 22 has moved such that an upper surface of the piston 22 is below the opening 32, and air is inlet into the interior space through the at least one intake valve 20 and forces combustion products to exhaust the interior space through the exhaust valve 34 into the exhaust conduit 30.

The exhaust valve 34 may be coupled to the exhaust conduit 30 by placing the exhaust valve 34 in the exhaust conduit 30, or more specifically, placing a reed valve in the exhaust conduit 30. The exhaust valve 34 may be configured to open based on a pressure differential whereby a greater pressure in the interior space than in the exhaust conduit 30 causes movement of the valve 34 to the open state.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Furthermore, the absence of structure in the drawings may be, in some embodiments, considered to indicate that such structure is intentionally lacking and omitted in an engine or other arrangement disclosed herein. The absence of such structure can, in some embodiments, provide benefits.

The invention claimed is:

1. A two-stroke engine, comprising:
   a cylinder having a peripheral wall defining an interior space;
   an engine crankshaft;
   a piston configured to move in said interior space of said cylinder in a first direction in a power stroke in which air and fuel in said interior space of said cylinder is ignited and said engine crankshaft to which said piston is coupled is rotated as a result of combustion of the air and fuel, and said piston being further configured to move in said interior space of said cylinder in a second direction in a compression stroke which is opposite to the first direction in which said piston moves in the power stroke;
   two intake conduits leading to said cylinder;
   a respective intake valve associated with each of said intake conduits and regulating flow of air from said intake conduit into said interior space of said cylinder;
   an exhaust conduit having an opening in said peripheral wall of said cylinder at a location between lowermost and uppermost positions of said piston; and
   an exhaust valve associated with said exhaust conduit,
   whereby in an exhaust-intake stroke after the power stroke when said piston has moved such that an upper surface of said piston is below said opening and said opening is in flow communication with said interior space of said cylinder, said exhaust valve is in an open state and air is inlet into said interior space of said cylinder through or around said intake valves and forces combustion products to exhaust said interior space of said cylinder through said exhaust valve into said exhaust conduit, and fuel is inlet into said interior space of said cylinder using a fuel injector.

2. The engine of claim 1, further comprising a spark plug to ignite the air and fuel in said interior space of said cylinder to cause the power stroke.

3. The engine of claim 1, wherein said exhaust valve is a reed valve.

4. The engine of claim 1, wherein said exhaust valve is in said exhaust conduit.

5. The engine of claim 1, wherein said exhaust valve is configured to open based on a pressure differential whereby a greater pressure in said interior space of said cylinder than in said exhaust conduit causes movement of said exhaust valve to the open state.

6. The engine of claim 1, wherein a region between said opening and said peripheral wall of said cylinder is smooth without any sharp edges.

7. The engine of claim 1, further comprising a connection rod to connect said piston to said engine crankshaft.

8. The engine of claim 1, further comprising:
an apparatus for providing a source of compressed air to said intake conduits, said apparatus comprising:
a rotatable compressor crankshaft;
a compressor cylinder defining an interior space and including a surface defining said interior space having a first aperture and a second aperture;
a first valve in said first aperture;
a second valve in said second aperture;
a piston compressor configured to move upon rotation of said compressor crankshaft in said interior space of said compressor cylinder;
a compressor intake conduit leading from ambient environment to said first aperture;
an air tank, said intake conduits being coupled to said air tank;
a compressor outlet conduit leading from said second aperture to said air tank; and
interconnection structure that interconnects said compressor crankshaft to said engine crankshaft such that rotation of said engine crankshaft causes rotation of said compressor crankshaft,
whereby rotation of said compressor crankshaft causes movement of said piston compressor in said interior space of said compressor cylinder and compression of air inlet into said interior space of said compressor cylinder through said compressor intake conduit and said first valve and outflow of compressed air through said compressor outlet conduit and said second valve to said air tank and enables flow of compressed air from said air tank through said intake conduits to said cylinder of said engine.

9. The engine of claim 8, wherein said interconnection structure comprises an automatic clutch connected to said engine crankshaft and a gear connected to said automatic clutch and said compressor crankshaft.

10. The engine of claim 8, wherein said piston compressor comprises a rod connected eccentrically to said compressor crankshaft, and a piston having a head portion connected to said rod and movable in said interior space of said compressor cylinder while surrounded by said compressor cylinder.

11. The engine of claim 8, further comprising a manifold coupled to said air tank and defining said intake conduits.

12. The engine of claim 8, further comprising:
a turbocharger connected to said exhaust conduit;
a turbocharger compressor connected to said turbocharger;
a turbocharger compressor inlet conduit leading from the ambient environment; and
a compressor conduit leading from said turbocharger compressor to said air tank,
whereby exhaust gas flowing through said exhaust conduit interacts with said turbocharger to power said turbocharger compressor to draw and compress air from the ambient environment through said turbocharger compressor inlet conduit and provide the compressed air to said air tank through said compressor conduit.

13. The engine of claim 12, further comprising:
a manifold coupled to said air tank and defining said intake conduits; and
valves in said compressor conduit, said compressor outlet conduit, and said manifold for maintaining pressure in said air tank.

14. A cylinder for an engine; comprising:
a peripheral wall defining an interior space;
a piston configured to move in said interior space in a first direction in an exhaust stroke and in a second, opposite direction in a power stroke in which air and fuel in said interior space is ignited;
two intake conduits leading to said interior space;
a respective intake valve associated with each of said intake conduits and regulating flow of air from said intake conduit into said interior space;
an exhaust conduit having an opening in said peripheral wall at a location between lowermost and uppermost positions of said piston; and
an exhaust valve associated with said exhaust conduit,
whereby in an exhaust-intake stroke after the power stroke when said piston has moved such that an upper surface of said piston is below said opening and said opening is in flow communication with said interior space, said exhaust valve is in an open state and air is inlet into said interior space through said intake conduits and forces combustion products to exhaust said interior space through said exhaust valve into said exhaust conduit, and fuel is inlet into said interior space using a fuel injector.

15. The cylinder of claim 14, wherein said exhaust valve is a reed valve in said exhaust conduit.

16. The cylinder of claim 14, wherein a region between said opening and said peripheral wall is smooth without any sharp edges.

17. An apparatus for providing a source of compressed air for a two-stroke engine having at least one engine cylinder and an engine crankshaft, comprising:
a rotatable compressor crankshaft;
a compressor cylinder defining an interior space and including a surface defining said interior space having a first aperture and a second aperture;
a first valve at least partly in said first aperture;
a second valve at least partly in said second aperture;
a piston compressor configured to move in said interior space of said compressor cylinder upon rotation of said compressor crankshaft;
a compressor intake conduit leading from ambient environment to said first aperture;
an air tank;
a compressor outlet conduit leading from said second aperture to said air tank;
an engine intake conduit system leading from said air tank to an interior space of the at least one engine cylinder of the engine; and
interconnection structure that interconnects said compressor crankshaft to the engine crankshaft such that rotation of the engine crankshaft causes rotation of said compressor crankshaft,
whereby rotation of said compressor crankshaft causes movement of said piston compressor in said interior space of said compressor cylinder and compression of air inlet into said interior space through said compressor intake conduit and said first valve and outflow of compressed air through said compressor outlet conduit and said second valve to said air tank.

18. The apparatus of claim 17, wherein said engine intake conduit system comprises a manifold defining conduits each leading to a respective one of a plurality of apertures defined by the at least one engine cylinder.

19. The apparatus of claim 18, further comprising a valve in said manifold to maintain pressure in said air tank.

20. The apparatus of claim 17, further comprising a valve in said compressor outlet conduit to maintain pressure in said air tank.

\* \* \* \* \*